July 21, 1964  J. RABINOW  3,141,378

MACHINE TOOL

Filed Jan. 15, 1962

INVENTOR
Jacob Rabinow

BY Joseph A. Genovese &
Max L. Libman

ATTORNEYS

United States Patent Office 3,141,378
Patented July 21, 1964

3,141,378
MACHINE TOOL
Jacob Rabinow, Bethesda, Md., assignor, by mesne assignments, to Control Data Corporation, Minneapolis, Minn., a corporation of Minnesota
Filed Jan. 15, 1962, Ser. No. 166,178
5 Claims. (Cl. 90—11)

This invention relates to machine tools and more particularly to methods and means to facilitate machine tool operations requiring a long reach.

Machine tools that cut large bodies of metal or other materials have reached an advanced stage of development. There is still a difficulty, however, when such tools are required to cut large pieces of work where the machine has to have a reach of ten feet, twenty feet or more. If the cutting tool has to be supported by a relatively slender arm, the difficulties with rigidity and precision have been, in the past, almost insurmountable. Just making the arm heavier does not lead to a solution because the weight itself gives rise to sag, bending and other problems. It is the objective of my invention to make it possible to give cutting tools an extremely long reach, to eliminate the effect of sagging, and to minimize or eliminate the effects of vibration, dimensional changes due to temperature differences, and incidentally to cool the cutting tool.

Tools supported on a long arm do give rise to other difficulties due to tool cutting reactions. My invention does not reduce these forces, but it does minimize vibrations set up by the cutter, and by permitting very free adjustment of the tool position, it enables me to use a very light final cut, as in grinding, that produces negligible reaction forces.

The main objectives of my invention are as follows:
 (1) To eliminate the effect of weight of the tool support and of the tool holder itself.
 (2) To damp the vibration which would be induced in arms used to support the tool and, incidentally, to damp the vibration of the work itself.
 (3) To maintain the temperature of the machine and of the work at a constant level so as to minimize dimensional errors due to temperature differences.
 (4) To provide effective cooling of the tool and the work being cut, and
 (5) To reduce the forces required in positioning the tool by eliminating the weight of the machine components and particularly by eliminating the weight of the arm and the tool support.

The above objectives are achieved by having the machine tool, or at least the arm thereof, submersed in a liquid and provided with a flotation device which hydrostatically supports either the entire weight of the arm, or at least a major part of the weight.

The above principle of hydrostatically supporting the arm of a machine can be used in connection with a variety of otherwise conventional machine tools and with special machines which are in the nature of machine tools. For example, the Neergaard Patent No. 2,423,440 shows a number of automatic machine tools and fabricating devices, some of which may utilize my invention. The Kelley Patent No. 2,706,426 discloses an apparatus for reproducing three dimensional designs. This apparatus is essentially a machine tool and here again, my invention may be used in connection therewith. The Gunderson Patent No. 2,808,765 discloses a master actuated tracer controlled milling machine having a comparatively long reach. The above patents disclose machines which are somewhat special and therefore, they are mentioned as a few of the many special machines wherein my invention may be used. In general, whenever a machine has a long reach, my invention makes it possible to construct the supporting arm of light construction, for example as a truss. The other features of my invention, namely temperature and vibration controls are applicable to nearly all machine tools.

In recent years there have been many machine tools made available, where the machine is electronically programmed. The Neergaard patent discloses a magnetic recording technique, and there are others. It is explicitly pointed out that my invention is concerned with making it possible and practical to greatly lighten the construction of a long supporting arm of a machine tool, regardless of how the machine tool is controlled and what it is used for, and regardless of the specific construction and nature of the remainder of the machine.

Another object of my invention is to provide a new method of performing operations on a work piece, where my method includes the steps of at least partially hydrostatically supporting the arm and operating the machine tool while the arm is so supported.

Other objects and features will become apparent in following the illustrated forms of the invention.

Figure 1:
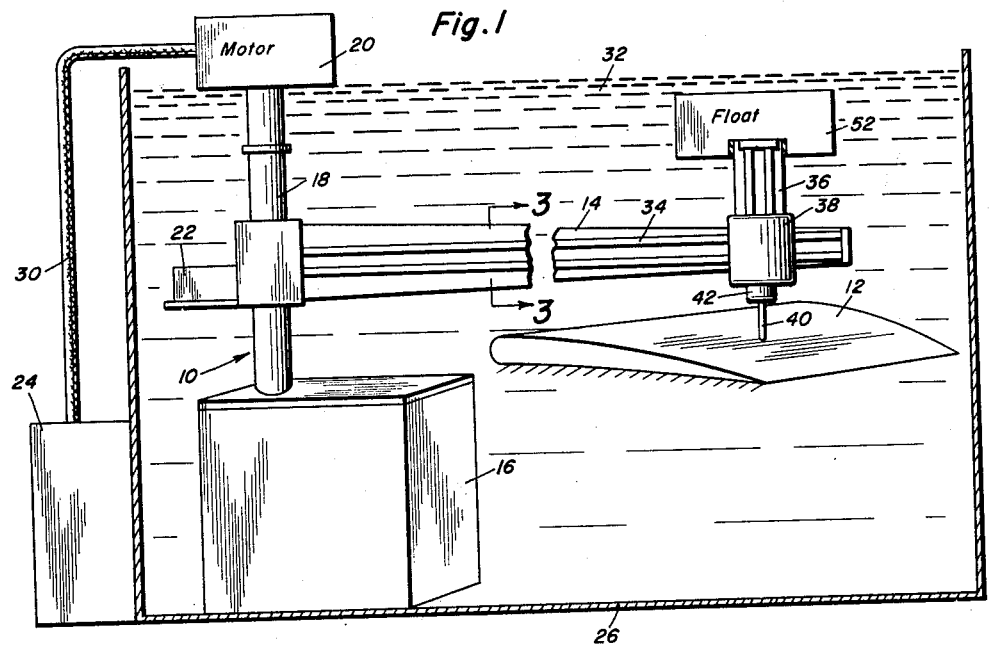
FIGURE 1 is a diagrammatic view showing my invention applied to an otherwise conventional three-dimensional profile cutter.
Figure 3:
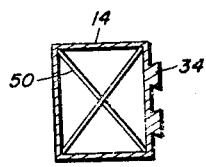
FIGURE 3 is a sectional view taken on line 3—3 of FIGURE 1.

In the accompanying drawing, FIGURES 1 and 3 show my invention applied to machine tool 10 which is a three-dimensional profile cutter. Three-dimentional cutters having a long reach are used for large-area work pieces such as the section 12 of an airfoil. Except for the arm 14, machine tool 10 is conventional. It includes a base 16, a vertical column 18 extending upwardly from the base, and motors 20 and 22 for the machine tool. Additional motors and other machine tool equipment is ordinarily housed in the base 16. If the machine tool 10 (shown) is automatically programmed, for instance, digitally, magnetically, etc., the programmer 24 is preferably, but not necessarily, located on the exterior of tank 26. Electrical coupling means represented by cable 30, connect the programmer with the remainder of the machine tool 10.

Tank 26 is a vessel containing liquid 32, such as water, ethylene, glycol, oil, etc. At least the arm 14 and work piece 12 are disposed in the liquid 32. The simplest way of achieving this is to place the entire machine tool 10 in the tank 26, although it is possible to have the machine above the tank or to have an opening in the side of tank 10 with the arm 14 projected into the opening, and the opening sealed by a diaphragm. Since this would somewhat restrict freedom of motion of the arm 14, it is preferred to place the entire machine tool 10 in the liquid 32 as is shown in FIGURE 1, or to have the tank below the machine tool with only the arm 14 in the tank.

Arm 14 has conventional ways 34 with which a longitudinally movable carriage 36 is engaged. The carriage has vertical ways for the cross head 38. Since the arm is rotatable about column 18, tool member 40 secured by chuck 42 or the equivalent to the cross head, is capable of movement along the x, y and z axes.

Instead of a heavy duty arm as would be required by using conventional machine design for a long arm-machine tool, FIGURE 3 shows a box beam configuration with internal bracing 50, for instance, cross struts. A box beam configuration is shown because it may be made hollow and liquid-tight so that the arm itself constitutes a float. Obviously, other sections may be selected for the arm and floats attached thereto, but in any case the construction of arm 14 is much lighter than would ordinarily be required if the arm were not at least partially supported by buoyancy. I have shown float 52 attached to carriage 36 (FIGURE 1) merely to indicate that if I wish, I may use exterior floats in addition to the float construction of the arm itself (FIGURE 3).

In use of the form of my invention shown in FIGURE 1, the machine tool is operated in normal way for the particular kind of machine tool. However, instead of having large bending moments and inertia forces to contend with during the performance of work on the work piece 12, the arm is hydrostatically supported along its length. Consequently, the arm may be made to execute maneuvers with far lower power requirements. Other advantages such as temperature control and vibration damping of the member 40 and the work piece, are inherent in my system.

Figure 2:
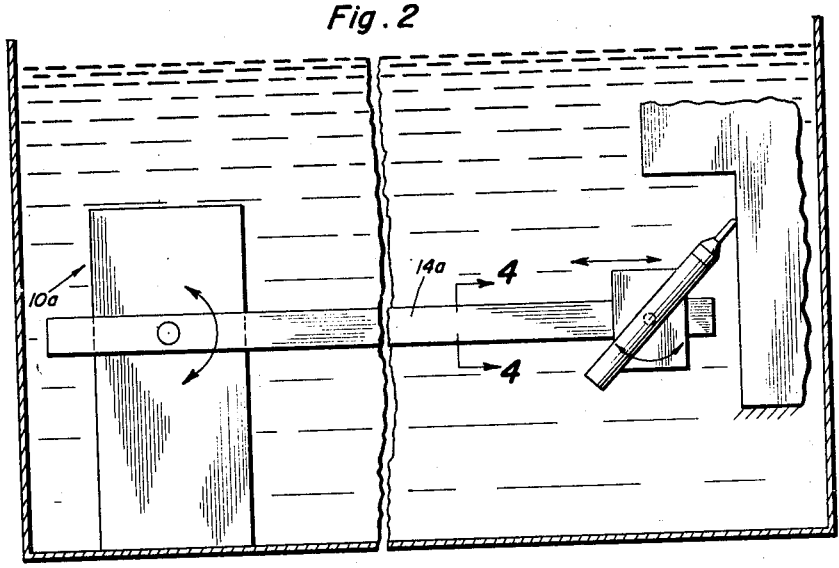
FIGURE 2 is a diagrammatic view showing a variation of my invention applied to a different type of machine tool.
Figure 4:
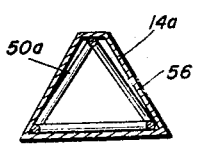
FIGURE 4 is a sectional view taken on line 4—4 of FIGURE 2.

The form of the invention, shown in FIGURES 2 and 4, differs from that in FIGURE 1 in the type of machine tool 10a that is shown and in the configuration of arm 14a. A different kind of machine tool 10a shown in FIGURE 2 to emphasize the fact that my invention is not limited to any specific kind of machine tool and further, the feature of lightness of construction of the arm 14 or 14a will exist regardless of whether the section of the arm is a hollow-core type such as in FIGURE 3 or essentially a truss type as shown in FIGURE 4 or any other accepted structural design. Arm 14a (FIGURE 4) is made of a truss 50a covered with a thin skin 56 to form a fluid-tight enclosure. The enclosure functions in the same manner as the box-beam enclosure of FIGURE 3, inherently functioning as a float and/or may be provided with the "kapok," cork, etc., float material.

The operation of the form of the invention shown in FIGURE 2 is precisely the same as that described in connection with the embodiment of FIGURE 1.

It is understood that the preceding description of the illustrated forms of my invention are given by way of example only. Various modifications, additions, alterations, etc., may be made without departing from the protection of the claims.

I claim:
1. In a machine tool having a stationary base and a tool holder, and means including a long arm moveably connected to said base to both move and support said tool holder in operative work piece-engaging position, the length of said arm projecting from said base being such as to ordinarily require a heavily constructed arm to be sufficiently rigid to support and move the holder with the necessary precision, the combination therewith of a vessel containing liquid, said tool holder and the work piece and said arm being located in the liquid, and means buoyant in said liquid and associated with said arm hydrostatically supporting said arm for flotation in the liquid to prevent said long arm from sagging.

2. The machine tool of claim 1 wherein said buoyant means associated with said arm include a liquid-tight cavity in said arm.

3. The machine tool of claim 2, and said buoyant means further including a float.

4. In a machine tool of the type used for performing cutting operations on a work piece having at least a portion located a distance from the base of the tool such that a comparatively long arm is required to support a cutting tool holder, and as such the arm is ordinarily required to be of heavy construction to withstand bending stresses and assure against arm sag, an improvement making possible a long arm of non-sagging but light construction, said improvement comprising a frame structure having walls and internal bracing forming a hollow elongate arm for said machine tool, said walls forming a closed cavity lengthwise of the arm, a liquid vessel in which said arm is disposed, and said arm with its cavity being substantially neutrally buoyant in the liquid so that said arm is hydrostatically supported in the liquid along the length thereof.

5. In a machine tool of the type having an elongate arm provided with a tool holder for a tool to work on a workpiece; a vessel containing liquid, said machine tool arm located in said liquid, and said arm having walls defining a liquid-tight cavity lengthwise of the arm by which the arm is hydrostatically supported along its length for flotation in the liquid to prevent sag of the arm.

References Cited in the file of this patent

UNITED STATES PATENTS

| | | |
|---|---|---|
| 301,165 | Rogers et al. | July 1, 1884 |
| 367,331 | Barnes | July 26, 1887 |
| 378,468 | Wilkinson | Feb. 28, 1888 |
| 1,946,390 | Christiansen | Feb. 6, 1934 |
| 2,161,570 | Harris | June 6, 1939 |
| 2,608,220 | Cauthen | Aug. 26, 1952 |
| 2,876,664 | Gurney | Mar. 10, 1959 |
| 3,018,697 | Schroeder et al. | Jan. 30, 1962 |